United States Patent
Koyano et al.

(10) Patent No.: US 7,379,646 B2
(45) Date of Patent: May 27, 2008

(54) OPTICAL FIBER PRODUCT, METHOD OF FABRICATING OPTICAL CABLE, AND CHARACTERISTIC EVALUATION METHOD

(75) Inventors: Yasushi Koyano, Yokohama (JP); Hiroyoshi Yamamoto, Yokohama (JP); Yasuhiro Naganuma, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 535 days.

(21) Appl. No.: 10/961,222

(22) Filed: Oct. 12, 2004

(65) Prior Publication Data

US 2006/0018610 A1   Jan. 26, 2006

(30) Foreign Application Priority Data

Jul. 21, 2004   (JP)   ............... P2004-213455

(51) Int. Cl.
   *G02B 6/00*   (2006.01)
(52) U.S. Cl. .................. 385/123; 356/73.1
(58) Field of Classification Search ............ None
   See application file for complete search history.

(56) References Cited

U.S. PATENT DOCUMENTS 5,894,537 A      4/1999   Berkey et al.
6,421,484 B2     7/2002   Tanaka et al.
6,473,548 B2 *  10/2002   Nagayama et al. ......... 385/100
7,153,034 B2 * 12/2006   Sasaoka et al. ............. 385/71

OTHER PUBLICATIONS

International Telecommunication Union G. 650 "Series G: Transmission Systems and Media, Digital Systems and Networks" (Oct. 2000).

* cited by examiner

*Primary Examiner*—Sung H Pak
(74) *Attorney, Agent, or Firm*—McDermott Will & Emery LLP

(57) ABSTRACT

The present invention relates to an optical fiber product suitable for fabricating an optical cable that requires a complicated length adjustment. The optical fiber product includes an effective use portion used as the optical cable, surplus portions connected to both ends of the effective use portion, and a distinguishing structure clearly indicating boundary portions between the effective use portion and the surplus portions. With the above structure, the surplus portions that become finally unnecessary are surely cut off in a fabrication step of the optical cable, thus enabling collect use of only effective use portion as the optical cable.

7 Claims, 8 Drawing Sheets

OPTICAL FIBER PRODUCT, METHOD OF FABRICATING OPTICAL CABLE, AND CHARACTERISTIC EVALUATION METHOD

BACKGROUND OF THE INVENTION

1. Field of the Invention

The present invention relates to an optical fiber product usable for a WDM (Wavelength Division Multiplexing) transmission system, having a structure for effectively restraining a fabrication error in a fabrication step and an installation step of the optical cable, and further relates to a method of evaluating a characteristic of the inventive optical fiber product.

2. Description of the Related Art

In a WDM transmission system, high-speed and large-capacity optical communication is enabled by using WDM signal light having multiplexed two or more signal channels of wavelengths different from each other. It is desired that an optical transmission line laid in each repeating section of the WDM transmission system has a superior signal transmission characteristic in a signal wavelength region (for example, in a wavelength band of 1.55 μm). Therefore, an optical fiber whose transmission characteristic changes along the longitudinal direction is proposed as an optical transmission line having a superior signal transmission characteristic.

For example, an optical fiber transmission line disclosed in U.S. Pat. No. 5,894,537 (Document 1) discloses is constituted by a unitary DMF (Dispersion-Managed Fiber) having a plurality of positive dispersion portions and a plurality of negative dispersion portions alternatively arranged so as to be adjacent to each other along its longitudinal direction. Each of the positive dispersion portions has a positive chromatic dispersion, and each of the negative dispersion portions has a negative chromatic dispersion in the signal wavelength region. When the absolute value of the chromatic dispersion in each of the positive and negative dispersion portions is set larger, a nonlinear optical phenomenon, four-wave mixing in particular, is suppressed. When the absolute value of average chromatic dispersion on the whole optical fiber transmission line is set smaller, the deterioration of transmission quality caused by the accumulated chromatic dispersion is also suppressed. The optical fiber transmission line disclosed in Document 1 is required to have a small average chromatic dispersion on the whole transmission line. Therefore, it is necessary to correctly set the length ratio the positive dispersion portion and the negative dispersion portion to a predetermined value, respectively.

However, even when the optical fiber transmission line is designed and fabricated so as to obtain a desired average transmission characteristic on the whole transmission line, there are some cases such that the average transmission characteristic on the whole optical fiber transmission line can not become a desired value after cut off, at the time that end parts of the optical fiber transmission line are cut off in a fabrication step of an optical cable and installation step of the optical cable. For example, in the fabrication step of the optical cable using the optical fiber transmission line as described above, both end parts of each optical fiber are cut off respectively until a desired condition is obtained in each step of assembling optical fiber transmission lines, water pressure resistant copper pipe welding, and sheath extrusion operation. The fiber lengths (referred to as "cut lengths" hereafter) of the both end parts cut off in each step are 100 m or more in total. Before and after cutting, the average transmission characteristic on the whole transmission line changes in accordance with the cut lengths. Particularly, in the transmission line having large absolute values of chromatic dispersion generated locally, the change of the average transmission characteristic (average chromatic dispersion) of the whole optical fiber transmission line is large before and after cutting.

U.S. Pat. No. 6,421,484B1 (Document 2) discloses an optical fiber transmission line having surplus portions connected to both ends of the use portion (portion applied to the optical fiber transmission line) beforehand. The surplus portions have a chromatic dispersion of substantially 0 ps/nm/km with respect to a wavelength in use and serve as cut portions for each work in the fabrication step of the optical cable.

Figure 1A:
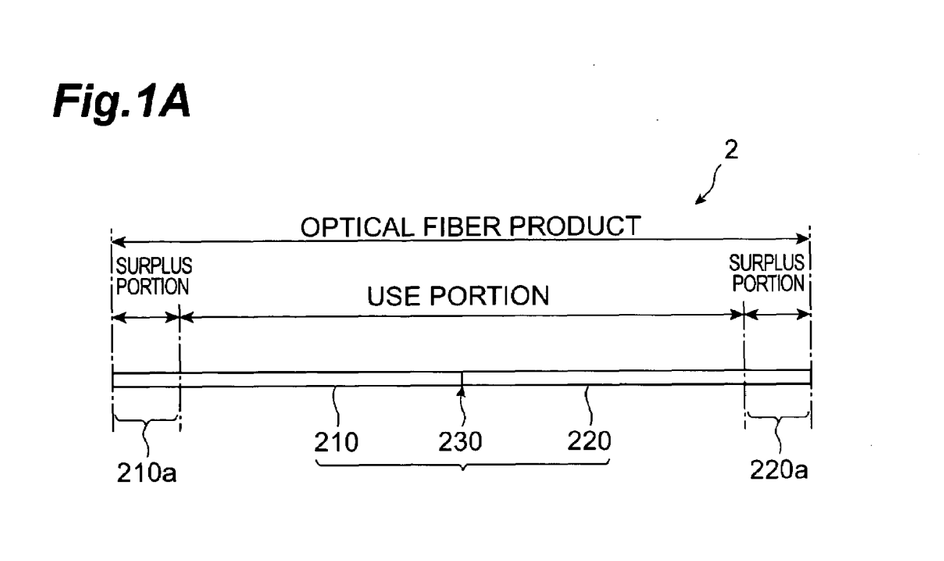
FIG. 1A is a view showing a schematic structure of the conventional optical fiber transmission line having surplus portions.

Specifically, as shown in FIG. 1A, the optical fiber transmission line 2 described in Document 2 as described above, includes an effective use portion 200 and surplus portions for working 210a and 220a connected to both ends of the effective use portion 200. The effective use portion 200 includes a first region 210 and a second region 220 which are fusion-spliced at a fusion-splicing point 230. The first region 210 has a positive chromatic dispersion and the second region 220 has a negative chromatic dispersion with respect to a predetermined wavelength within a signal wavelength band (for example, wavelengths of 1550 nm).

Figure 1B:
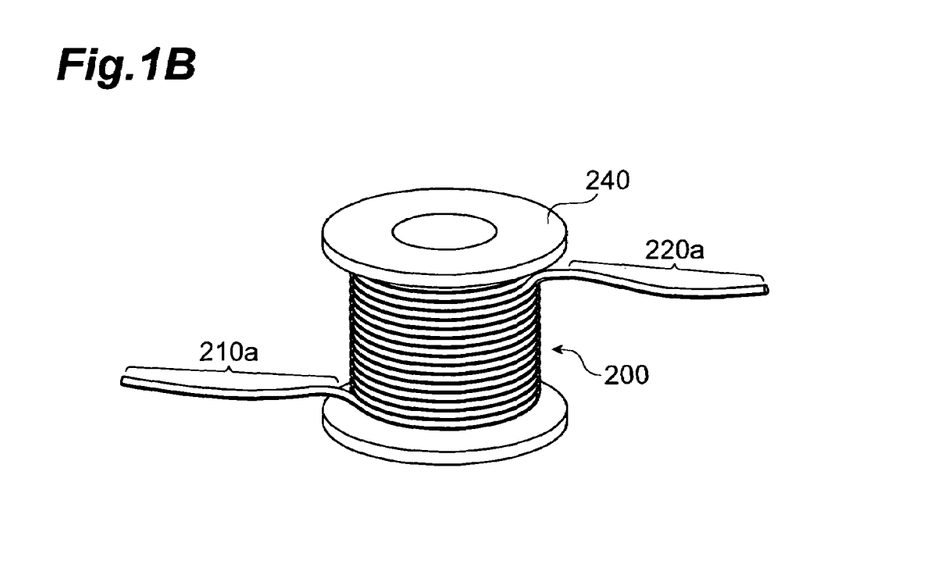
FIG. 1B is a view showing a finished state of the optical fiber transmission line at shipment.

An optical fiber fabricator delivers the optical fiber transmission line 2 having the above-described structure to an optical cable fabricator, while the optical fiber is wound around a take-up bobbin 240 as shown in FIG. 1B.

SUMMARY OF THE INVENTION

The inventors have studied the conventional techniques as described above, consequently have found some problems as follows. That is, in a DMF disclosed in Document 1, it is necessary to correctly set the length ratio of the positive dispersion portion and the negative dispersion portion, respectively. Actually, the chromatic dispersion of the general DMF includes a region having a positive chromatic dispersion of about +20 ps/nm/km, and a region having a negative chromatic dispersion of about −40 ps/nm/km. The positive dispersion region and the negative dispersion region are set to be the length ratio of about 1:2, so as to satisfy the chromatic dispersion of about −3 ps/nm/km in a standard repeating span (referred to as span hereafter) of about 50 km. In this case, the length control of the DMF is especially important in order to suppress the chromatic dispersion per each span small.

Therefore, the optical fiber fabricator or the cable fabricator is required to connect the optical fibers each having a small chromatic dispersion to both ends of the DMF as surplus portions for each work, like an optical fiber transmission line disclosed in Document 2 as described above. For example, when the test after winding shows that the finish of the winding of the optical fiber transmission line is not satisfactory, the optical fiber transmission line is required to be re-wound. Accordingly, the surplus portions for re-winding are required on the optical fiber fabricator also. On the other hand, the optical cable fabricator also needs the surplus portions in order to make optical fiber products into cable.

Figure 2A:
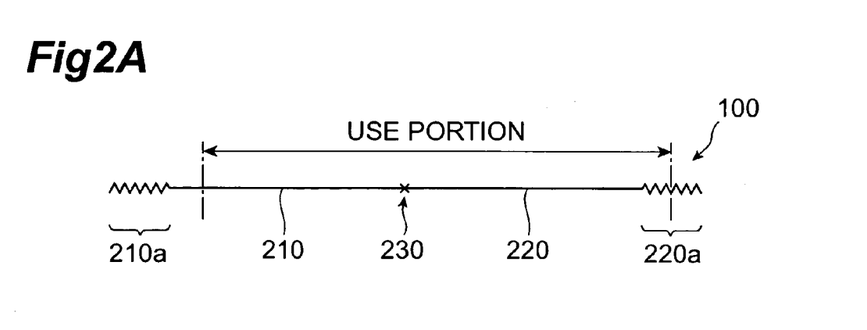
FIGS. 2A to 2C are views for explaining the problems of the conventional optical fiber transmission line.
Figure 2B:
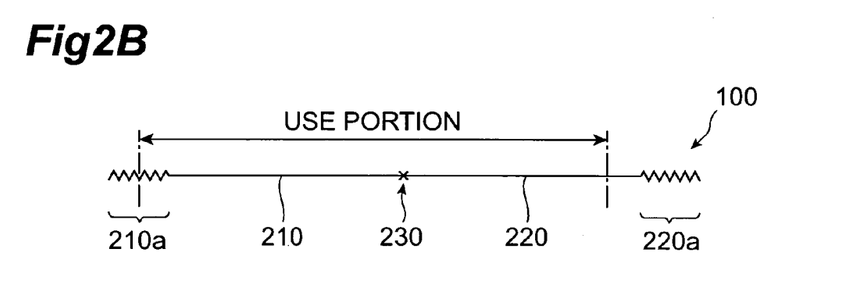
Figure 2C:
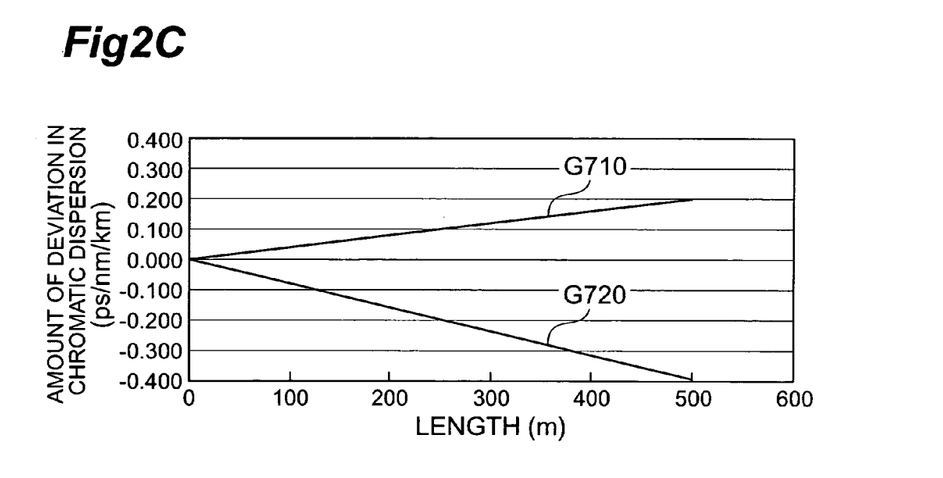

However, if the surplus portions are connected to the both ends of the DMF in each step up to installation work of the optical cable, the work in each step becomes troublesome. In addition, as shown in FIGS. 2A and 2B, the effective use portion of the optical fiber transmission line prepared is not distinguished from the surplus portions newly added, thereby posing the possibility that the surplus portions are used for the optical cable as a result. That is, at the time of fabricating the optical cable, when a part of the effective use portion is cut off instead of the surplus portions, deviation occurs between the chromatic dispersion characteristic of the obtained optical cable itself and a designed value, originating in the length of the effective use portion cut off (FIG. 2C). In this case, the effective use portion is required to be clearly distinguished from the surplus portions, in the optical fiber transmission line.

On the other hand, in the characteristic evaluation of the chromatic dispersion, for example, in the optical fiber transmission line including the surplus portions, the surplus portions affect the chromatic dispersion of the whole optical fiber transmission line. Therefore, without special optical fiber parts that have to be prepared as the surplus portions, the chromatic dispersion of the part finally used for the optical cable can not be correctly grasped.

An object of the present provides, for solving the problems as described above, the optical fiber product including the surplus portions to be used in each step up to installation work of the optical cable as an end product and having the structure with which the effective use portion set beforehand as the end product can be correctly used, and a fabrication method of the optical cable using the optical fiber products. In addition, the object of the present invention is to provide a characteristic evaluation method enabling the characteristic evaluation of the effective use portion used for the end products, the optical fiber product evaluated by the characteristic evaluation method, and a fabrication method of the optical cable using the optical fiber product evaluated by the characteristic evaluation method, from the measurement results of the whole body of the optical fiber product including the surplus portions.

The optical fiber product according to the present invention comprises an effective use portion where a first region with a positive chromatic dispersion at a predetermined wavelength and a second region with a negative chromatic dispersion at the predetermined wavelength are alternately arranged in the longitudinal direction, and the surplus portions positioned at both ends of the effective use portion and used in each work process up to installation work of the optical cable. Specifically, the optical fiber product include the DMF (Dispersion-Managed Fiber) where the first region with the positive chromatic dispersion and the second region with the negative chromatic dispersion are alternately arranged along the longitudinal direction in the predetermined wavelength, and this DMF corresponds to the effective use portion satisfying the required chromatic dispersion characteristic. Meanwhile, the surplus portions positioned at both ends of the effective use portion may be a part of the DMF that is continuous with the effective use portion. Also, the surplus portions may be optical fiber parts that are fusion-spliced at both ends of the effective use portion.

In particular, it is preferable that the optical fiber product according to the present invention further comprises a distinguishing structure for distinguishing the effective use portion from the surplus portions. With the above structure, in a cutting step after working is finished, the effective use portion can be correctly separated from the surplus portions, thus facilitating the fabrication of the optical cable that requires complicated length adjustment. Note that the surplus portions are cut in each work process up to installation work of the optical cable. Therefore, the surplus portions may have the distinguishing structure at boundary portions between required parts, so as to separately distinguish the required parts in each work process. With the distinguishing structure for clearly distinguishing the effective use portion from the surplus portions, unnecessary surplus portions are surely cut finally in the fabrication step of the optical cable. Therefore, the optical fiber parts used for the surplus portions beforehand are not especially limited when the optical fiber has product information given beforehand. On the contrary, in accordance with the present invention, the optical fiber parts having a special chromatic dispersion characteristic as shown in Document 2 are not required to be separately prepared.

For example, the distinguishing structure may includes one or more colored layers applied onto the surfaces of the surplus portions, and also may includes marks clearly indicating the boundary portions between the surface of the effective use portion and the surfaces of the surplus portions. Moreover, the optical fiber product according to the present invention may further comprise a coating layer covering the effective use portion and the surplus portions. In this case, the distinguishing structure preferably includes the structure such that a thickness of a part of the coating layer where connected portions between the effective use portion and the surplus portions are covered is different from a thickness of the remaining part of the coating layer where the effective use portion and the surplus portions are covered without the connected portions. Further, the distinguishing structure may include the colored layers applied onto the surface of the effective use portion and the surfaces of the surplus portions, while exposing predetermined regions including the surface of the effective use portion and the surfaces of the surplus portions.

Further, in the optical fiber product according to the present invention, the length ratio of the surplus portions to the whole length of the optical fiber product may be about 0.5% to 1%. In addition, the effective use portion in the optical fiber product is constituted by fusion-splicing the optical fiber parts respectively corresponding to the first and second regions adjacent to each other. Moreover, the effective use portion in the optical fiber product may be constituted by a unitary optical fiber transmission line where the first and second regions are alternately arranged.

The characteristic of the above-described optical fiber product is evaluated as an incoming test before fabricating the optical cable using the optical fiber product, and before installing the optical cable. Therefore, the chromatic dispersion characteristic of the whole body of the optical fiber product includes the chromatic dispersion characteristic of the surplus portions as an error component, thus posing the possibility that a required characteristic is not satisfied. On the other hand, the surplus portions are necessary portions in each fabrication work and installation work of the optical cable. However, the surplus portions do not become a part of the optical cable as a final product. Therefore, in the characteristic evaluation method for the optical fiber product according to the present invention, the chromatic dispersion characteristic of the effective use portion of the optical fiber product including the surplus portions is selected to be evaluation data by using the information relating to the surplus portions. In the characteristic evaluation method according to the present invention, the information relating to the surplus portions given beforehand is used. Therefore, the chromatic dispersion characteristic of the effective use portion can be grasped, irrespective of whether the distinguishing structure is included or not in the optical fiber product to be evaluated.

Specifically, a characteristic evaluating method according to the present regards the optical fiber product with the above-described structure as evaluation objects, and sequentially performs a measuring step, a calculating step, and an evaluating step. In the measuring step, the chromatic dispersion characteristic of the whole body of the optical fiber product to be evaluated is measured. The chromatic dispersion characteristic of the whole body of the optical fiber product obtained by the measuring step includes the chromatic dispersion characteristic of the surplus portions as an error component, thus posing the possibility that the required characteristic is not satisfied. The surplus portions are necessary in each fabrication work and installation work of the optical cable. However, the surplus portions do not become a part of the optical cable as a final product. Then, in the calculating step, based on the measurement result and the product information (length and chromatic dispersion) of the surplus portions given beforehand, the error component included in the chromatic dispersion of the whole body of the optical fiber product and the chromatic dispersion of the effective use portion of the optical fiber product are calculated. In the evaluating step, at least required chromatic dispersion characteristic given beforehand as a product specification of the optical fiber products and the calculated effective use portion of the optical fiber products are compared. As a result, when the calculated effective use region falls within a predetermined allowed range of the required chromatic dispersion characteristic, the evaluated optical fiber products are presented for fabrication of the optical cable.

Next, in a method of fabricating an optical cable according to the present invention, a plurality of optical fiber products each having the above-described structure are prepared, and each of the optical fiber products prepared is subjected to product evaluation using the above-described characteristic evaluating method (the method of evaluating a characteristic of an optical fiber product according to the present invention). Then, only optical fiber products confirmed to have a desired characteristic are selected in the product evaluation, and the surplus portions of each of the selected optical fiber products are successively cut by necessary lengths, thereby fabricating the optical cable.

In the method of fabricating an optical cable also, the optical fiber products used are not limited to those having the distinguishing structure. However, when the optical fiber used has the distinguishing structure for indicating a part to be cut or cutting region, a correct length adjustment is enabled in each fabrication step of the optical cable.

DESCRIPTION OF THE PREFERRED EMBODIMENTS

For a more complete understanding of the present invention and the advantages thereof, reference is now made to the following description of optical fiber products, a characteristic evaluating method, and a method of fabricating an optical cable, in conjunction with FIGS. 3A, 3B, 4, 5A-5D, 6, and 7A-8C. In the description of drawings, the same or equivalent potions will be denoted by the same reference symbols, without redundant description.

Figure 3A:
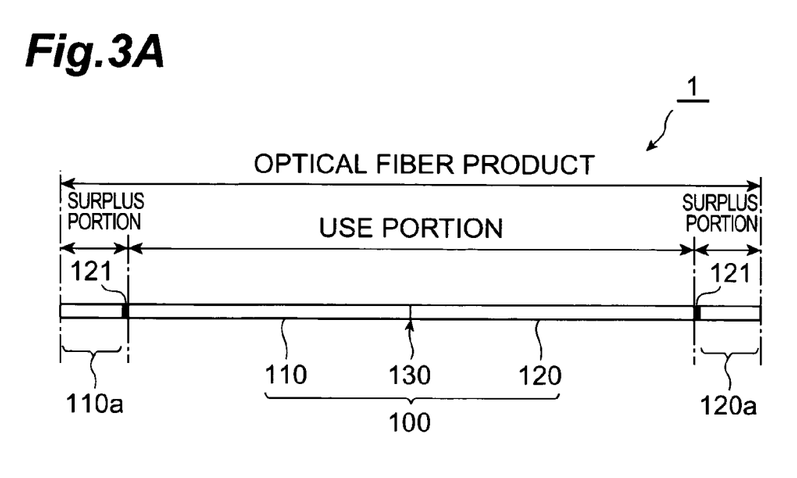
FIG. 3A is a view showing a schematic structure of an embodiment of the optical fiber product according to the present invention.
Figure 3B:
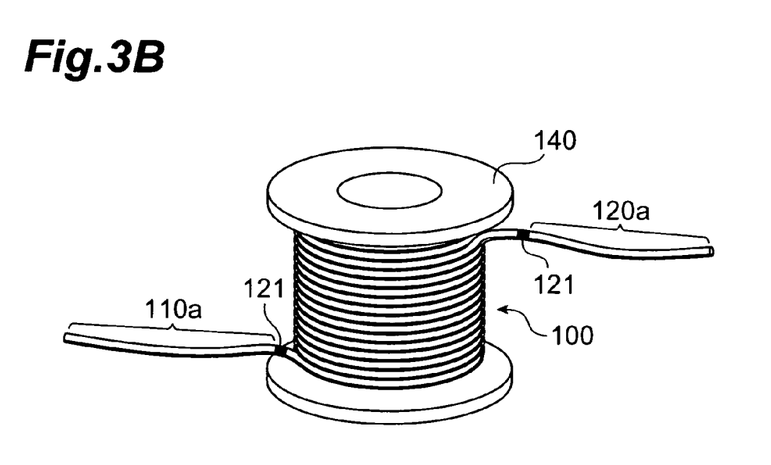
FIG. 3B is a view showing a finished state of the optical fiber product at shipment.

FIG. 3A is a view showing a schematic structure of an embodiment of the optical fiber product according to the present invention, and FIG. 3B is a view showing a finished state of the optical fiber product at shipment.

As shown in FIG. 3A, the optical fiber product 1 according to the present invention comprises an effective use portion 100 used as an optical cable, and working surplus portions 110a and 120a connected to both ends of the effective use portion 100. The effective use portion 100 includes a first optical fiber (first region) 110 and a second optical fiber (second region) 120 which are fusion-spliced at a fusion-splicing point 130. The first optical fiber 110 has a positive chromatic dispersion and the second optical fiber 120 has a negative chromatic dispersion, at a predetermined wavelength within a signal wavelength band (for example, a wavelengths of 1550 nm). Moreover, the optical fiber product 1 includes distinguishing structure 121 for clearly indicating the boundary portions between the effective use portion 100 and the surplus portions 110a and 120a.

Figure 4:
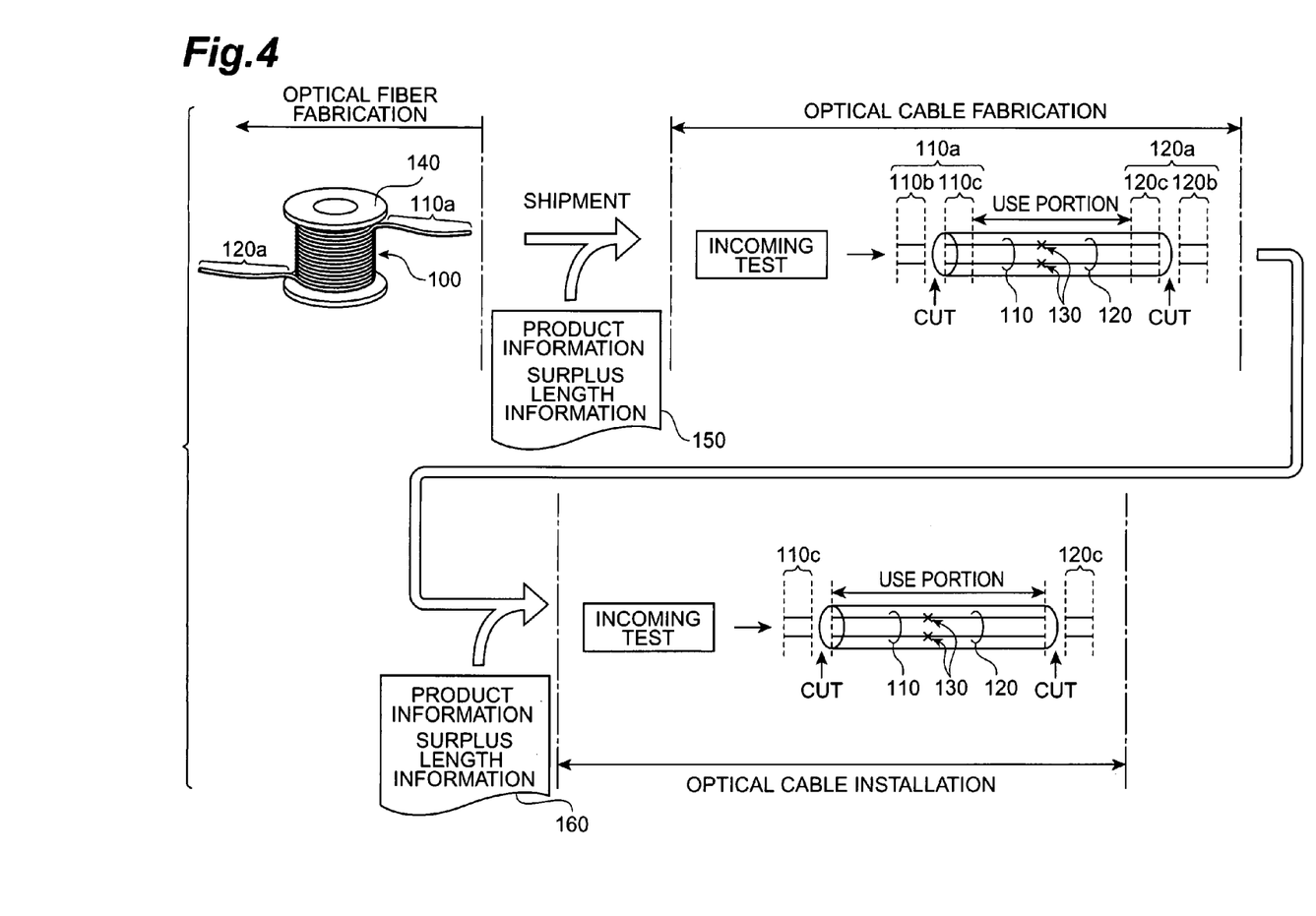
FIG. 4 is a view for schematically explaining each step from the fabrication of the optical fiber to the installation work of an optical cable.

An optical fiber fabricator delivers the optical fiber product 1 having the structure shown in FIG. 3A to an optical cable fabricator, while the optical fiber product 1 is wound on a take-up bobbin 140 as shown in FIG. 3B. FIG. 4 is a view for schematically explaining each step from the fabrication of the optical fiber to the installation work of the optical cable.

That is, the bobbin 140 (FIG. 3B) wound with the optical fiber product 1 (FIG. 3A) is shipped from the optical fiber fabricator to the optical cable fabricator, together with product information of the optical fiber products 1. The product information includes the information relating to the length and chromatic dispersion of the optical fiber product, the information relating to the length and chromatic dispersion of the optical fiber part applied to the effective use portion 100, and the information relating to the length and chromatic dispersion of the surplus portions 110a and 120a.

For example, in a dispersion management fiber (DMF) corresponding to the effective use portion 100 of the optical fiber product 1, the length ratio of the negative dispersion optical fiber 110 to the positive dispersion optical fiber 120 is set so that the sum total of the chromatic dispersion D1 in the negative dispersion optical fiber 110 and the chromatic dispersion D2 in the positive dispersion optical fiber 120 becomes a desired chromatic dispersion. Specifically, in the wavelength of 1550 nm, the chromatic dispersion of the negative dispersion optical fiber 110 of 20 km length is set to be −40 ps/nm/km. On the other hand, the chromatic dispersion of the positive dispersion optical fiber 120 of 30 km length is set to be +20 ps/nm/km. At this time, the length of the effective use portion 100 becomes 50 km, and the chromatic dispersion is −4 ps/nm/km. The optical fiber parts of the surplus portions 110a and 120a connected to both ends of the effective use portion 100 are not especially limited. Therefore, the optical fiber parts may be common single mode optical fiber (SMF) of 250 m length having the chromatic dispersion of about +17 ps/nm/km in the wavelength of 1550 nm. The SMF serving as the above-described surplus portions 110a and 120a is fusion-spliced to both ends of the DMF corresponding to the effective use portion 100 on the optical cable fabrication side. Further, the distinguishing structure 121 clearly indicating the boundary portions with the surplus portions 110a and 120a are added (see FIG. 3A). Accordingly, product information 150 delivered from the optical fiber fabricator to the optical cable fabricator includes the characteristic of the optical fiber product 1 (substantially the characteristic of the effective use portion 100) such as total length of 50.5 km (including surplus portions), chromatic dispersion of −4 ps/nm/km, the characteristic of the negative dispersion optical fiber 110 such as length of 20 km, chromatic dispersion of −40 ps/nm/km, and the characteristic of the positive dispersion optical fiber 120 such as length of 30 km, chromatic dispersion of +17 ps/nm/km. On the other hand, the information relating to the surplus portions 110 and 120 includes the information such as total length of 500 m and chromatic dispersion of +20 ps/nm/km.

When a plurality of the above-described optical fiber products 1 and the information 150 relating to the products and the surplus portions are delivered from the optical fiber fabricator to the optical cable fabricator, the optical fiber products 1 are subjected to an incoming test first. Then, the optical cable is fabricated by using only optical fiber products 1 that have passed the test. At the time of the test and fabrication of the optical cable, unnecessary portions 110b and 120b of the surplus portions 110a and 120a of each of the optical fiber products 1 are cut off, thus leaving surplus portions 110c and 120c as a part of the optical cable. The fabricated optical cable is then delivered to an optical cable installation side from the optical cable fabricator together with information 160 relating to the product and remaining surplus portions.

On the optical cable installation side also, the products are subjected to incoming test, and only optical cable that has passed the test is laid. At the time of the test and installing the optical cable, the surplus portions 110c and 120c that become finally unnecessary are cut off, and only effective use portion 100 (DMF) is used finally as the optical cable.

FIGS. 5A to 5D are views for describing each work process of the optical cable fabrication. Specifically, FIGS. 5A to 5D are views showing length change of the optical fiber products 1 in each fabrication step of the optical cable.

Figure 5A:
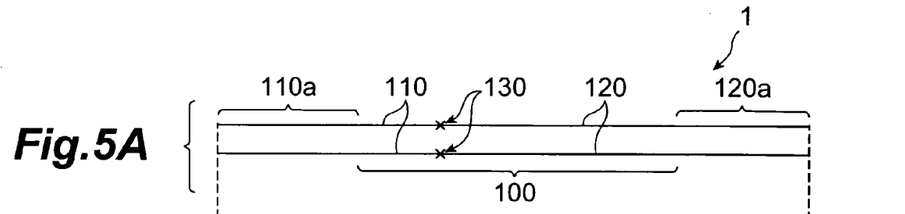
FIGS. 5A to 5D are views for explaining each work process in the optical cable fabrication.

As shown in FIG. 5A, each of the optical fiber products 1 includes the effective use portion 100 where the negative dispersion optical fiber 110 and the positive dispersion optical fiber 120 are fusion-spliced at splicing points 130, and the surplus portions 110a and 120a connected to both ends of the effective use portion 100.

Figure 5B:
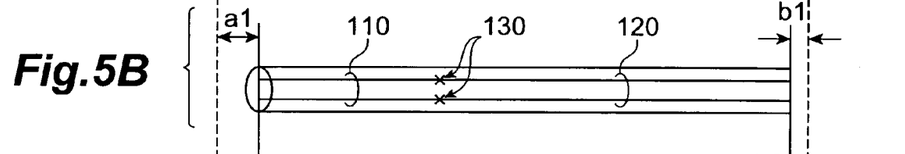
Figure 5C:
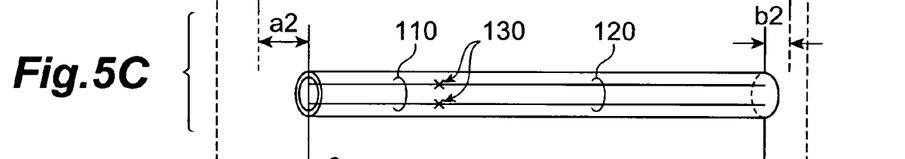
Figure 5D:
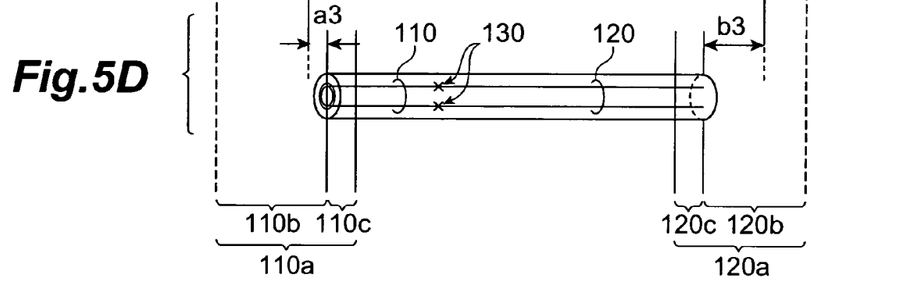

As shown in FIG. 5B, when a plurality of optical fiber products 1 are bundled, the surplus portion 110a is cut off by a length of a1, and the surplus portion 120a is cut off by a length of b1. When welding a water pressure resistant copper pipe also, the surplus portion 110a is cut off by a length of a2, and the surplus portion 120a is cut off by a length of b2 (FIG. 5C). Further when operating sheath extrusion, the surplus portion 110a is cut off by a length of a3, and the surplus portion 120a is cut off by a length of b3 (FIG. 5D). Through the above steps, the surplus portion 110c remains as a part of the optical cable on the side of the surplus portion 110a, and the surplus portion 120c remains as a part of the optical cable on the side of the surplus portion 120a.

On the other hand, the incoming test is conducted on the optical cable fabricator and on the optical cable installation side respectively in order to evaluate the quality such as chromatic dispersion. For example, the chromatic dispersion measurement, shown in ITU-T G.650 (10/2000), PP. 44-48, is performed.

Figure 6:
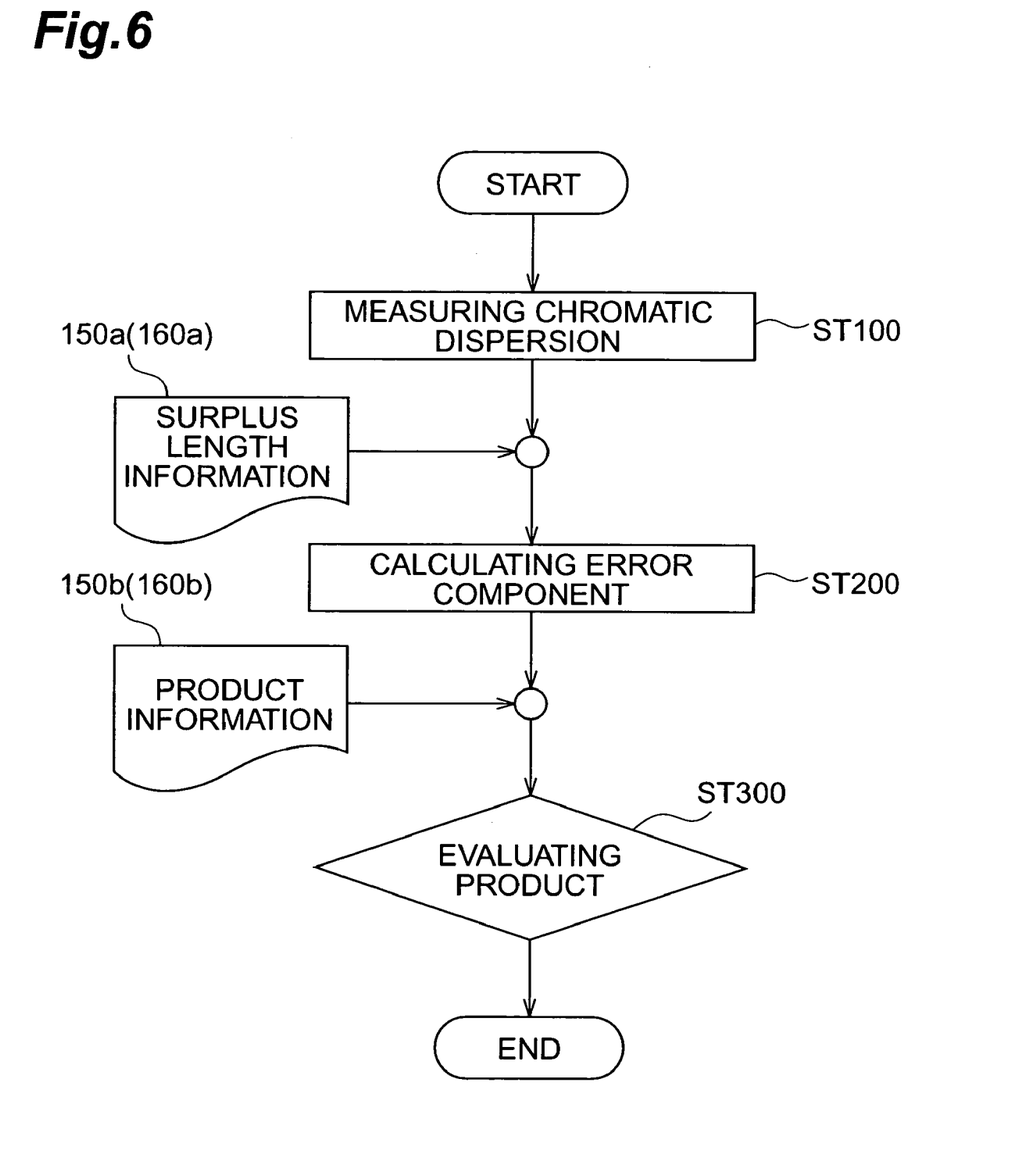
FIG. 6 is a flow chart for explaining the method of evaluating characteristic of the optical fiber product.

In the characteristic evaluating method according to the present invention, according to the flow chart shown in FIG. 6, the product evaluation of the optical fiber product 1 is conducted. Note that, in the characteristic evaluating method, irrespective of whether the optical fiber products have the distinguishing structures or not, the optical fiber products are capable of being evaluation objects when the surplus portions are included.

That is, in the characteristic evaluating method, the measuring step (step ST100), the calculating step (step ST200), and the evaluating step (step ST 300) are successively carried out. First, in the step ST 100, the chromatic dispersion of the whole body of the optical fiber product 1 to be evaluated is measured using the measuring device shown in FIG. 4A. There is a possibility that the chromatic dispersion characteristic of the whole body of the optical fiber product 1 obtained by the measuring step is affected by the chromatic dispersion in the surplus portions 100a and 120a as an error component. Therefore, in the step ST 200, based on the information 150 relating to the surplus portions 100a and 120a given beforehand, the chromatic dispersion (error component) of the surplus portions 100a and 120a is calculated.

In the step ST 300, based on the measurement result and the computation result obtained by the steps ST 100 and ST 200, by calculating the chromatic dispersion of the effective use portion 100 of the optical fiber product 1 to be evaluated, and by comparing the chromatic dispersion calculated and product information 160 of the optical fiber product 1 given beforehand, determines whether or not the optical fiber product 1 to be evaluated are received.

When fabricating the optical cable, only optical fiber products confirmed to have a desired characteristic is selected from the optical fiber products evaluated using the method for evaluating characteristic (FIG. 6). Then, by successively cutting the surplus portions of each of the selected optical fiber products by required lengths, the optical cable is fabricated.

As described above, the optical fiber product 1 according to the present invention have the effective use portion 100 used as the optical cable, and the distinguishing structure 121 added thereto for distinguishing the effective use portion 100 from the surplus portions 110a and 120a. The effective use portion 100 is used as the optical cable, and the surplus portions 110a and 120a are used in each step up to installation work of the optical cable. Whereby, in the fabrication step of the optical cable, the unnecessary surplus portions are surely cut off finally.

Figure 7A:
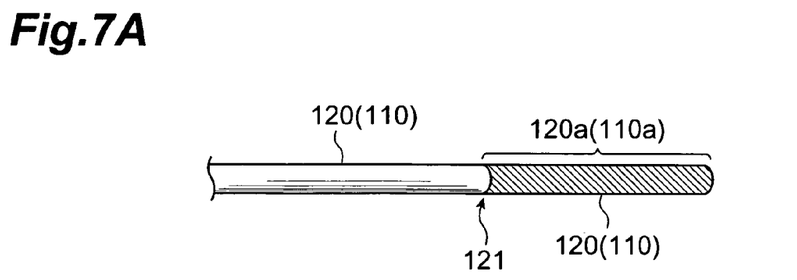
FIGS. 7A to FIG. 7C are views for explaining various distinguishing structures in the optical fiber product according to the present invention.
Figure 7B:
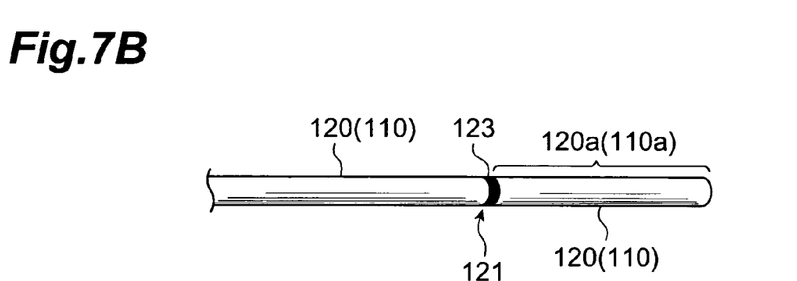
Figure 7C:
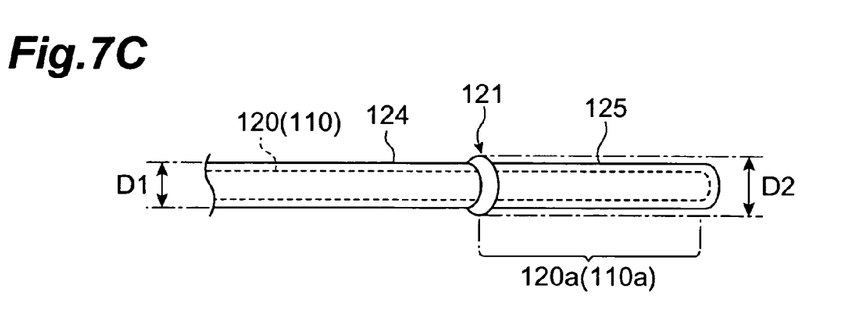

The following various structures may be used as the distinguishing structure 121. For example, FIGS. 7A to 7C are views for describing the various distinguishing structures in the optical fiber product 1 according to the present invention. Note that in FIGS. 7A to 7C, only surplus portion 120a side connected to the positive dispersion optical fiber 120 is shown, omitting the overlapping description.

For example, the distinguishing structure 121 shown in FIG. 7A is constituted of a colored layer 122 applied onto the surface of the surplus portion 120a. In addition, the distinguishing structure 121 shown in FIG. 7B may be constituted of a mark 123 clearly indicating the boundary portion between the surface of the effective use portion 100 and the surface of the surplus portion 120a. The optical fiber product 1 according to the present invention includes coating layers respectively covering the effective use portion 100 and the surplus portions 100a and 120a. Accordingly, as shown in FIG. 7C, the distinguishing structure 121 may be constituted so as to change the thickness (outer diameter D2) of the connected region between the coating layers 124 and 125 to the thickness (outer diameter D1) of the remaining region of the coating layers 124 and 125. Further, the distinguishing structure 121 may be constituted by colored layers applied onto the surface of the effective use portion 100 and the surface of the surplus portion 120a, while exposing predetermined regions including the boundary portion between the surface of the effective use portion 100 and the surface of the surplus portion 120a.

Figure 8A:
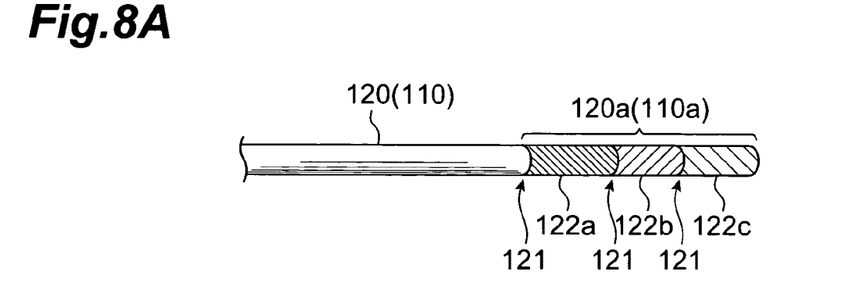
FIGS. 8A to 8C are views for explaining application examples of various distinguishing structures shown in FIGS. 7A to 7C.
Figure 8B:
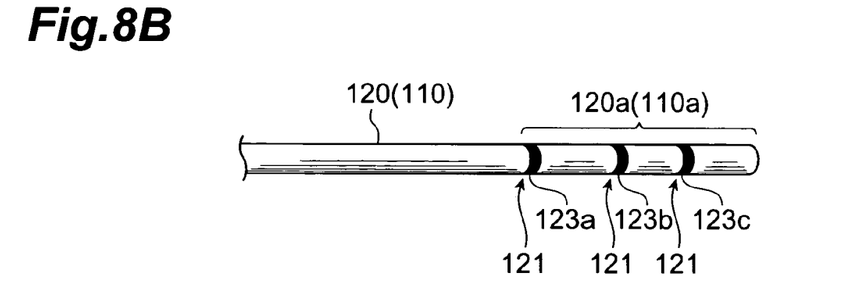
Figure 8C:
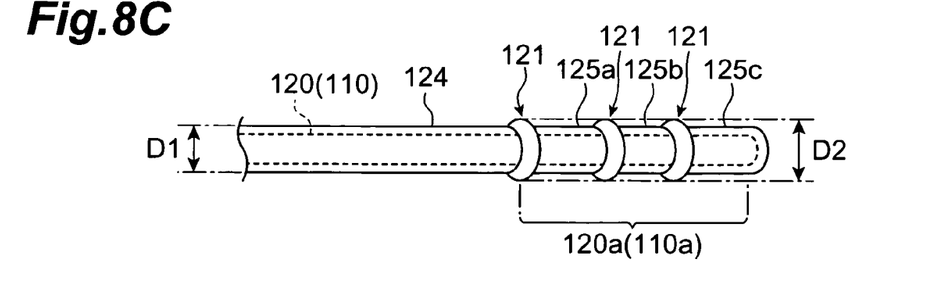

Further, the optical cable fabrication and the installation work have various steps. In each of the steps, the surplus portions 110a and 120a are successively cut off by required lengths. Therefore, the distinguishing structure 121 may also be constituted so that not only boundary portions between the effective use portion 100 and the surplus portions 110a and 120a are clearly shown, but also the parts of the surplus portions 110a and 120a that are cut off in each step are distinguished. FIGS. 8A to 8C are views for explaining the distinguishing structure 121 (application examples of the various distinguishing structures shown in FIGS. 7A to 7C) clearly indicating a part to be cut in each step. Note that in FIGS. 8A to 8C also, only surplus portion 120a side connected to the positive dispersion optical fiber 120 is shown, omitting the overlapping description.

That is, as shown in FIG. 8A, the distinguishing structure 121 may be divided into colored layers 120a, 122b, and 122c, so that the parts to be cut of the colored layers applied onto the surface of the surplus portion 120a are shown in each step. Moreover, as shown in FIG. 8B, the distinguishing structure 121 may be constituted of marks 123a, 123b, and 123c for indicating not only boundary portion between the surface of the effective use portion 100 and the surface of the surplus portion 120a but also boundary portion between the parts to be cut in each step. Further, as shown in FIG. 8C, the distinguishing structure 121 may be constituted so as to change the each thickness of the connected regions between the coating layers 124, 125a, 125b, and 125c to each thickness of the remaining regions of the coating layers 124, 125a, 125b, and 125c. Moreover, the distinguishing structure 121 may be constituted by colored layers applied onto the surface of the effective use portion 100 and the surfaces of the surplus portions 110a and 120a, with a plurality of regions being exposed. The regions include the parts of the surplus portions 110a and 120a to be cut in each step.

As described above, in accordance with the present invention, the optical fiber products used for the optical cable have the distinguishing structure added thereto for distinguishing the effective use portion used as the optical cable, from the surplus portions used in each step up to installation work of the optical cable. In this way, when the distinguishing structure for clearly distinguishing the effective use portion from the surplus portions are provided, the surplus portions that become unnecessary finally in the fabrication step of the optical cable are surely cut off. Moreover, the optical fiber parts used for the surplus portions beforehand are not especially limited, when product information is given beforehand. Therefore, it is not necessary to separately prepare special optical fiber parts having special chromatic dispersion characteristics.

In addition, the optical fiber product according to the present invention includes the optical fiber parts having product information beforehand as the surplus portions, and the distinguishing structure for distinguishing the effective use portion used as the optical cable from the surplus portions. Therefore, the surplus portions can be correctly removed finally. Accordingly, the optical fiber products of the present invention are suitable for the optical cable which requires complicated length adjustment.

What is claimed is:

1. A method of evaluating a characteristic of an optical fiber product comprising an effective use portion where a first region with a positive chromatic dispersion at a predetermined wavelength and a second region with a negative chromatic dispersion at the predetermined wavelength are arranged alternately along a longitudinal direction of said effective use portion, and surplus portions positioned at both ends of the effective use portion and used in each work process up to installation work of an optical cable, said method comprising the steps of:

measuring a chromatic dispersion of said whole optical fiber product including said surplus portions;

calculating an error component included in the chromatic dispersion of said whole optical fiber product and the chromatic dispersion of said effective use portion in said optical fiber product, based on the measured chromatic dispersion of said whole optical fiber product and the product information thereof relating to said surplus portions given beforehand; and comparing a value of the chromatic dispersion obtained from the product information of said optical fiber product given beforehand, and the calculated chromatic dispersion of said effective use portion in said optical fiber product.

2. A method according to claim 1, wherein said effective use portion in said optical fiber product is constituted by fusion-splicing optical fiber parts respectively corresponding to said first and second regions adjacent to each other.

3. A method according to claim 1, wherein said effective use portion in said optical fiber product is constituted by a unitary optical fiber transmission line where said first and second regions are alternately arranged.

4. A method according to claim 1, wherein the length ratio of said surplus portions to the whole length of said optical fiber product is 0.5% to 1%.

5. An optical fiber product evaluated by a method according to claim 1.

6. A method of fabricating an optical cable, said method comprising the steps of:

preparing a plurality of optical fiber products each including an effective use portion where a first region with a positive chromatic dispersion at a predetermined wavelength and a second region with a negative chromatic dispersion at the predetermined wavelength are alternately arranged along a longitudinal direction of said effective use portion, and surplus portions positioned at both ends of said effective use portion and used in each work process up to installation work of said optical cable;

evaluating each of said prepared plurality of optical fiber products by using a method according to claim 1;

selecting only optical fiber products confirmed to have a desired characteristic by said product evaluation method, from said prepared optical fiber products; and making said selected optical fiber products into cable while successively cutting said surplus portions of said selected optical fiber products by required lengths.

7. A method of fabricating an optical cable, said method comprising the steps of:

preparing a plurality of optical fiber products, each of said plurality of optical fiber products comprising: an effective use portion where a first region with a positive chromatic dispersion at a predetermined wavelength and a second region with a negative chromatic dispersion at the predetermined wavelength are alternately arranged along a longitudinal direction of said effective use portion; surplus portions positioned at both ends of said effective use portion and used in each work process up to installation work of an optical cable; and a distinguishing structure for distinguishing said effective use portion from said surplus portions;

evaluating each of said prepared plurality of optical fiber products by using a method according to claim 1;

selecting only optical fiber products confirmed to have a desired characteristic from said prepared optical fiber products in said product evaluation method; and making said selected optical fiber products into cable, while successively cutting by required lengths said surplus portions clearly indicated by said distinguishing structure included in each of said selected optical fiber products.

* * * * *